US009298570B2

(12) United States Patent
Milks et al.

(10) Patent No.: US 9,298,570 B2
(45) Date of Patent: Mar. 29, 2016

(54) PROCESSOR DEVICE WITH RESET CONDITION TRACE CAPABILITIES

(71) Applicant: Microchip Technology Incorporated, Chandler, AZ (US)

(72) Inventors: Justin Milks, Chandler, AZ (US); Thomas Edward Perme, Chandler, AZ (US); Sundar Balasubramanian, Chandler, AZ (US); Kushala Javagal, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 253 days.

(21) Appl. No.: 13/888,367

(22) Filed: May 7, 2013

(65) Prior Publication Data

US 2013/0297974 A1    Nov. 7, 2013

Related U.S. Application Data

(60) Provisional application No. 61/643,725, filed on May 7, 2012.

(51) Int. Cl.
G06F 11/00     (2006.01)
G06F 11/26     (2006.01)
G06F 11/36     (2006.01)

(52) U.S. Cl.
CPC .......... *G06F 11/26* (2013.01); *G06F 11/3636* (2013.01); *G06F 11/3656* (2013.01)

(58) Field of Classification Search
CPC ............... G06F 11/25; G06F 11/362–11/366; G06F 11/3466–11/3495; G06F 11/323; G06F 11/3636–11/3656; G06F 11/261; G06F 11/273; G06F 11/267; G06F 1/24; G06F 11/348; G06F 11/26; G01R 31/3177; G01R 31/318594; G01R 31/28; G01R 31/31705
See application file for complete search history.

(56) References Cited

U.S. PATENT DOCUMENTS

| | | | | |
|---|---|---|---|---|
| 6,792,527 | B1 * | 9/2004 | Allegrucci | 713/1 |
| 2004/0103271 | A1 * | 5/2004 | Agarwala et al. | 713/1 |
| 2004/0153814 | A1 * | 8/2004 | Swoboda et al. | 714/36 |
| 2008/0288808 | A1 * | 11/2008 | Moyer | 714/2 |

OTHER PUBLICATIONS

International Search Report and Written Opinion, Application No. PCT/US2013/039934, 9 pages, Jul. 12, 2013.

\* cited by examiner

*Primary Examiner* — Jason Bryan
(74) *Attorney, Agent, or Firm* — Slayden Grubert Beard PLLC

(57) ABSTRACT

A processor device with debug capabilities has a central processing unit, debug circuitry including a trace module, a system clock module for providing internal clock signals, and a reset detection unit which during a debug mode prevents the system clock module from receiving a reset signal.

18 Claims, 10 Drawing Sheets

PROCESSOR DEVICE WITH RESET CONDITION TRACE CAPABILITIES

CROSS-REFERENCE TO RELATED APPLICATIONS

This application claims the benefit of U.S. Provisional Application No. 61/643,725 filed on May 7, 2012, entitled "PROCESSOR DEVICE WITH INSTRUCTION TRACE CAPABILITIES", which is incorporated herein in its entirety.

TECHNICAL FIELD

The present disclosure relates to processor devices, in particular microcontroller devices with integrated debug capabilities.

BACKGROUND

Modern microprocessors and microcontrollers include circuitry that efficiently allows analyzing a running program by means of a so-called in-circuit debugger or emulator device. To this end, a microcontroller or microprocessor provides for internal circuitry that supports debugging functions and a specific interface which can be for example activated by programming multiple function pins of the device to operate as the debug interface. Such an interface usually can be configured as a high speed serial interface to allow for fast communication between the actual device and the external debugger or emulator. The device itself can thus be operated in a normal operating mode which does not activate this interface and associated pins can be used for other purposes and a debug operating mode which uses this interface to exchange data with respective external devices, such as debuggers or emulators that can be operated from and by an external host computer. The debuggers or emulators can also be operated as programmers, wherein the program is transferred into the target device via the same debug interface. Host computer, external debugger or emulator thus forms an inexpensive analysis and debugging system.

Modern processors and microcontrollers provide for an extended set of debug functions inside the respective device. For example, a number of breakpoints can be set within the device to allow the device to actually run in real time which would not be possible with an external debugger when using just a high speed serial interface and thus would require bond-out chips and expensive debug circuitry. However, the functionality of these internal debug circuitries is of course somewhat limited due to a limited amount of silicon real estate and other reasons. For example, trace back functions are often not supported by external in circuit debuggers and even more complex in circuit emulators may not sufficiently support a trace function when in debug mode, in particular when the device executes a reset.

SUMMARY

Therefore a need exists, for an improved in circuit debug unit within a processor or microcontroller device. For example, an instruction trace through both asynchronous and synchronous resets is made possible according to various embodiments.

According to an embodiment, a processor device having debug capabilities, may comprising a central processing unit, debug circuitry including a trace module, a system clock module for providing internal clock signals, and a reset detection unit which during a debug mode prevents the system clock module from receiving a reset signal.

According to a further embodiment, the trace module can be operable to record trace information after a reset signal has been detected and generates a signal after recording the trace information that resets the system clock module. According to a further embodiment, the trace information may include a reset source information. According to a further embodiment, the trace module may generate a trace stream including information about executed instructions, wherein the trace stream is output through an external interface. According to a further embodiment, the trace stream can be packet based. According to a further embodiment, the trace packet may include information about the trigger source. According to a further embodiment, the information can be provided conditionally, wherein the condition can be user defined. According to a further embodiment, a reset signal can be a synchronous reset signal or an asynchronous reset signal. According to a further embodiment, a synchronous reset signal can be generated by a watchdog timer WDT, a RESET instruction executed by the central processing unit, a Stack overflow/underflow reset. According to a further embodiment, an asynchronous reset signal can be received through an external pin of the processor device.

According to another embodiment, a method for debugging executed code within a processor device may comprise executing code by a central processing unit (CPU); upon determining of a reset, forwarding reset signals to internal units of the microcontroller with the exception of a system clock module to allow further operation of a trace module; and record trace information after reception of the reset.

According to a further embodiment of the method, the method may further comprise resetting the system clock module after the trace information has been recorded. According to a further embodiment of the method, the trace information may include a reset source information. According to a further embodiment of the method, the trace module may generate a trace stream including information about executed instructions, wherein the trace stream is output through an external interface. According to a further embodiment of the method, the trace stream can be packet based. According to a further embodiment of the method, the trace packet may include information about the trigger source. According to a further embodiment of the method, the information can be provided conditionally, wherein the condition can be user defined. According to a further embodiment of the method, a reset signal can be a synchronous reset signal or an asynchronous reset signal. According to a further embodiment of the method, a synchronous reset signal can be generated by a watchdog timer WDT, a RESET instruction executed by the central processing unit, a Stack overflow/underflow reset. According to a further embodiment of the method, an asynchronous reset signal can be received through an external pin of the processor device.

DETAILED DESCRIPTION

A typical microcontroller device may have several asynchronous and synchronous system reset sources. Even though the microcontroller unit (MCU) system stops operation upon such a reset occurrence, according to various embodiments, an instruction trace module within a debug unit of the device will record the reset occurrence and the source. To this end, the various embodiments provide instruction trace through external, asynchronous and internal synchronous device resets.

According to various embodiments, a trace system blocks the reset to the system clock configuration module, synchronizes the reset (if asynchronous) and records the reset. The system has therefore no timing sensitivity to the reset.

Figure 1:
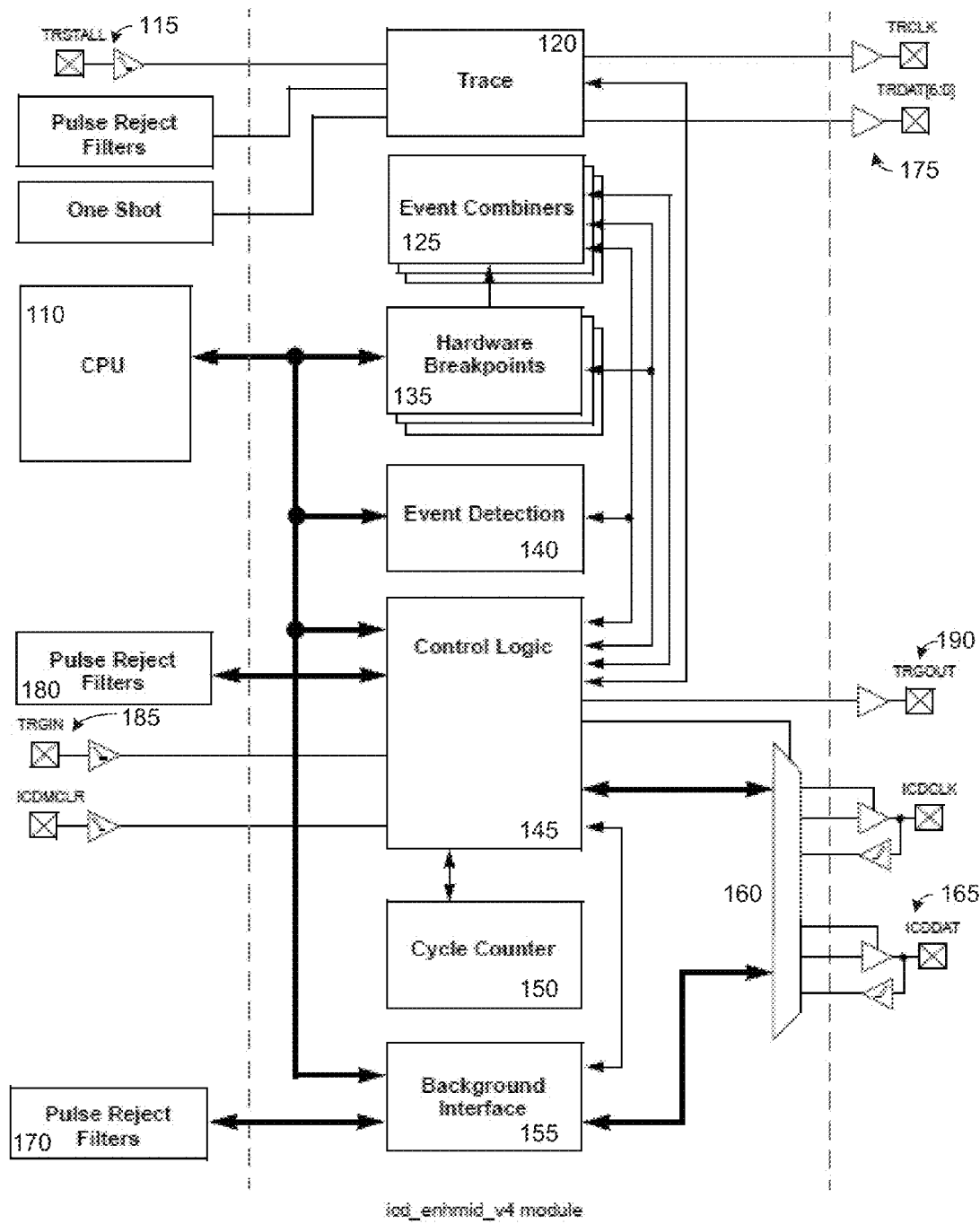
FIG. 1 shows a block diagram of an integrated debug module according to various embodiments.

FIG. 1 shows a block diagram of an in-circuit-debug module that can be integrated within a microcontroller according to an embodiment. However, the general concept as described above can be implemented in other types of on-chip debug circuitry. The block diagram shows a module that can be implemented for example in a microcontroller and may consists of five basic blocks:

Breakpoint Compare Logic 135
Stop-Watch Cycle counter Logic 150
Control and State Machine Logic 145
Trace Logic 120
Event Combiner logic 125

CPU 110 is coupled with hardware breakpoint unit 135, event detection unit 140, control logic unit 145 and background interface 155 through an internal bus. Multiplexer 160 is used to allow coupling of the debug unit with an external debugger through dedicated debug clock and data pins 165. The control logic 145 may be coupled with one or more external pins. FIG. 1 shows an exemplary TRGIN pin 185. Such a pin may be a dedicated pin with no other function. However, in particular in low-pin devices, such a pin may be a multi-function pin that allows to be assigned under program control to different peripheral devices and therefore can perform different functions according to its programmed assignment. For example, such a pin may be programmed by means of a configuration register to be in addition to the trace trigger in function to act as a serial interface clock pin, a digital I/O pin, an analog input pin, etc. As shown in FIG. 1 the control logic also provides for a trigger out pin 190 that can be similar to pin 185 a multi-function pin. The trace module 120 is coupled with a trace stall input pin 115, and trace clock and data output pins 175. FIG. 1 also shows pulse reject filters 170 and 180 that may be configurable through control logic 145. Signal routing through such filters is not shown in FIG. 1. According to some embodiments, breakpoint debugging is implemented such that execution is halted before the instruction is executed, so-called "zero skid" operation. According to other debugger embodiments this is not true and may cause problems with where code stops or "skids", allowing an instruction to execute before the processor is halted. External events are (by definition) asynchronous to the instruction execution stream. As such, their operation cannot be compared to zero skid concepts.

When an internal signal debug_en=1, the module is enabled and monitors all the "HALT" events, generates events, performs data capture, etc. If the internal signal debug_en=0, all debug logic is disabled and the module is configured to consume minimum power mode.

To make debugging less invasive, it may be useful to have a means of streaming data off the device in real-time. The trace module 120 supports a method taking data being read or written to a specific address and transmitting it out the Trace port. This can be described as a Real-time watchpoint. Normal operation of the device is not interrupted when using a watchpoint.

Data capture may be performed using the same hardware as is used for generating a hardware breakpoint. Using a breakpoint for data capture at the same time as generating a halt will allow both operations to occur. However, enabling data capture and data matching at the same time may generate unexpected results, especially for breakpoint counts greater than one. As the data capture and data compare use the same physical register, the compare value will be updated on every capture.

Figure 2:
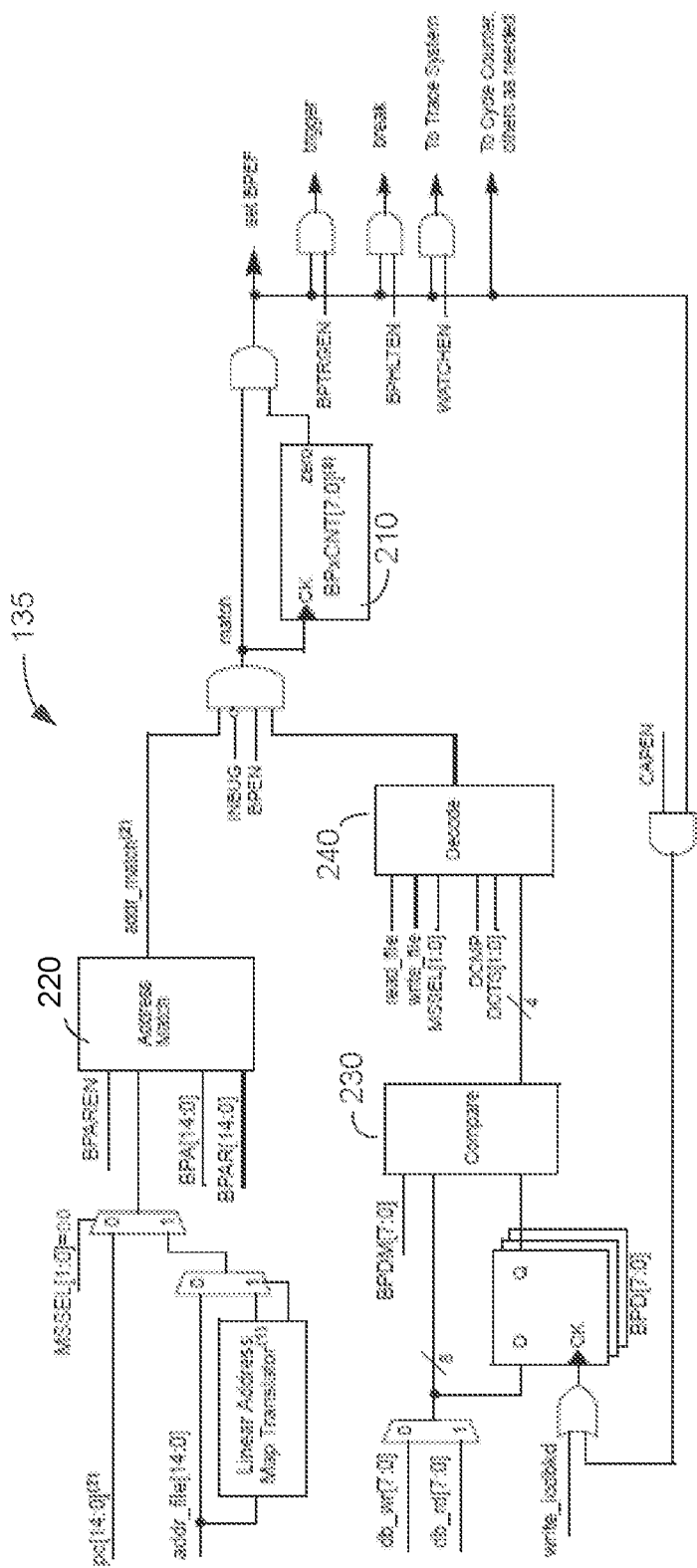
FIG. 2 shows a hardware breakpoint block diagram of FIG. 1 in more detail.

FIG. 2 shows the hardware breakpoint unit 135 in more detail. Hardware breakpoints can be configured to break on matching addresses in either program or data memory. To this end, respective comparators 220 and 230 and decoding units 240 are provided as shown in FIG. 2. When the breakpoint is selected to operate on data memory, the breakpoint can additionally be qualified with data value and a mask, allowing only certain values to generate a breakpoint event. Data breakpoints can also optionally be set to only break on read or write cycles. In all cases, the breakpoints have a counter 210 so that the specific event must occur N times before the breakpoint event is generated. This can be set, for example, for any value from 1 to 256 times according to some embodiments.

The block diagram of FIG. 2 is shown for a single breakpoint. The number of breakpoints implemented is however variable according to various embodiments, many breakpoints may exist. FIG. 2 shows an exemplary embodiment that allows various parameters to be programmed to define the trigger requirements for a breakpoint. According to other embodiments, less or more of such parameters may be used. For example, the number of breakpoint occurrences necessary to generate a breakpoint can be set by the BPxCNT parameter in counter 210. Each breakpoint module may have identical registers.

Breakpoints are listed among the event channel definitions and can be used to start or stop the cycle counter 150, set or reset an event combiner stage 125, start or stop trace unit 120, or take a stack snapshot.

According to one embodiment, for the breakpoint to be enabled, the bit BPEN of a control register ICDBPxCON must be set. If this bit is cleared, all circuitry for this specific breakpoint is disabled and no breakpoint events will be generated. The breakpoint can be configured to only trigger an action on every N-th occurrence of the qualifying conditions. For example, to set a breakpoint to trigger on every third occurrence, the counter 210 is set to BPxCNT=2. Respective control registers may be used in combination with counter 210 to reload its value and/or monitor the current state.

Breakpoints may also be qualified based on execution context (main line code, interrupt handler, or either), by setting respective bits, for example in an associated configuration register. A breakpoint may then only occur when the program is executing from a selected context.

Yet another breakpoint parameter may be used, by setting respective bits in a configuration register, which allow to monitor the program counter (PC execution address). Program Memory breaks are zero skid, and occur before the operation is executed. The PC will indicate the address of the trigger instruction.

When a respective control bit is cleared, e.g. BPAREN='0', a break is triggered when the PC equals a predefined address. When BPAREN=;1', a break is trigged when the PC falls within the predefined inclusive range of addresses.

According to some embodiments, only executed instructions can generate a breakpoint. If the PC is at an address that is not executed, the breakpoint does not trigger. This includes:
  flow changing instructions (CALL, RETURN, etc.),
  skipped instructions (per BTFSS, BTFSC), or
  the next fetch after a PCL, FSR, or other two cycle instructions.

When another control bit field is set to 01, 10, or 11 in a control register, the breakpoint monitors data accesses, both address and value. The three states of the associated bits select whether read or write cycles are used to determine the breakpoint.

Data breakpoints, by necessity, cause a break at the end of instruction execution, after data is read or written (as applicable). In all cases, the instruction runs to completion. Accordingly, the "break" actually occurs on the next instruction execution, and the PC will indicate the instruction following the trigger instruction. A break may also be triggered when both the memory address and data value qualifiers have been met.

The cycle counter 150 is a counter used to provide a stopwatch function so that user code can be profiled. The cycle counter is controlled by respective control registers. The counter 150 may consist of four 8-bit counter/registers. The counter 150 may be incremented at the end of every Q-cycle of the CPU; multi-cycle instructions (e.g., GOTO) count multiple times.

In order to allow multiple functions to be controlled by specific events, all of the possible sources in the may be combined into one event bus. This allows the Cycle Counter 150, Trace unit 120, and Event combiners unit 125 to use the same settings to select their actions.

Figure 3:
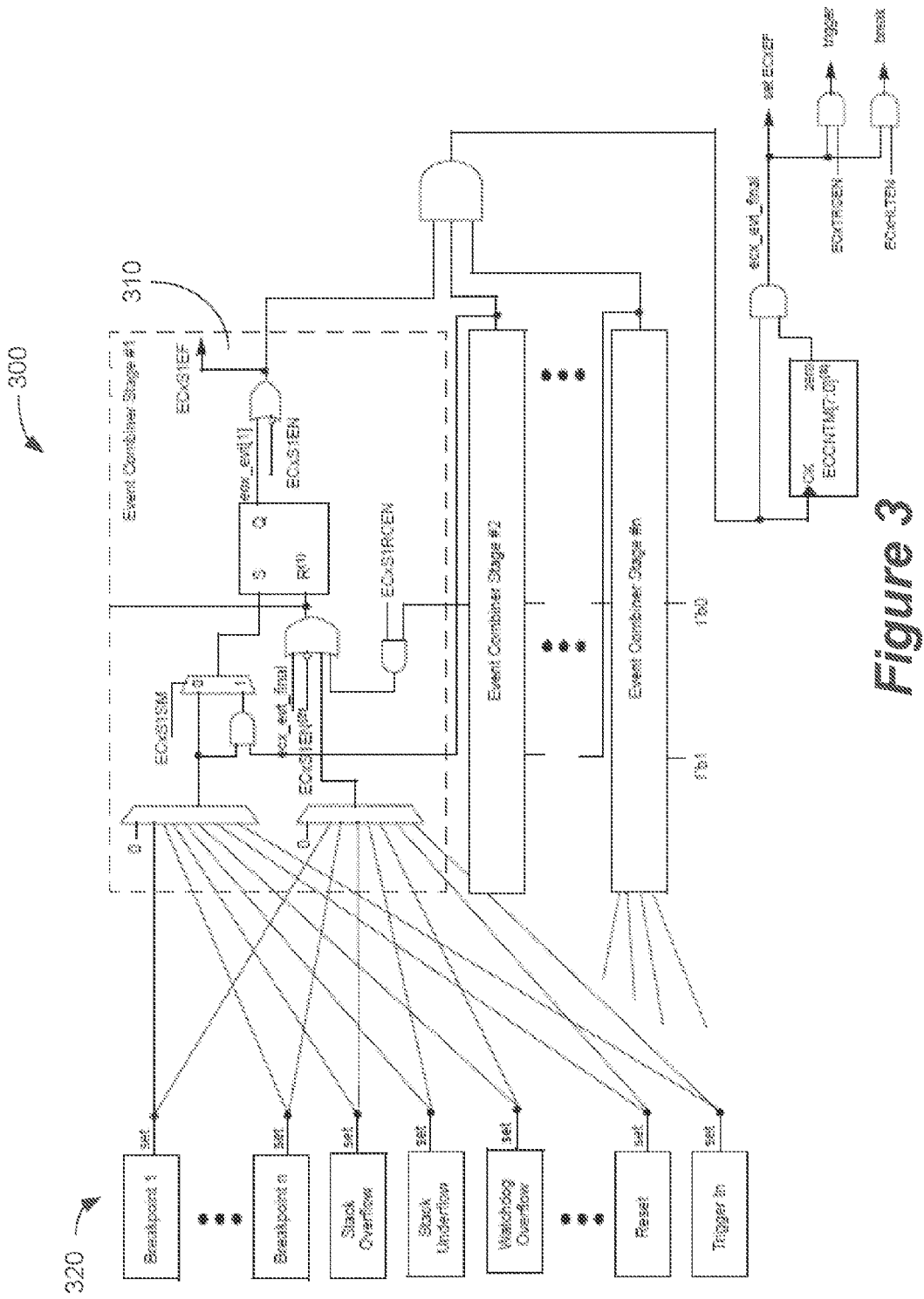
FIG. 3 shows an event combiner block diagram of FIG. 1 in more detail.

An event combiner 300 as shown in FIG. 3 monitors multiple event inputs 320 and can generate a halt or a trigger out 190 based on combinations and sequences of those inputs. An event combiner 300 is enabled when a respective control bit is set. Disabled combiners 300 do not produce output events. Event combiners 300 are listed among the event channel definitions and can be used to start or stop the cycle counter 150, set or reset an event combiner stage 310, start or stop trace unit 120, or take a stack snapshot. Event combiner stages 310 are independently enabled when respective control bits for that stage are set in associated control registers. A stage's current output will be reflected in an associated status bit. Stages 310 have an implied order as shown in FIG. 3, and can be combined in a number of ways:
  a stage can be activated individually by an event,
  a stage can be activated by an event while the next lower stage is active,
  a stage can be deactivated individually by an event,
  a stage can be deactivated by an event or when the next lower stage is deactivated.

By setting a respective control bit, only the (N+1)-th occurrence of the combined event(s) will signal an output event. N can be set from 0 to 255. If the combined trigger conditions are met, then the register is decremented by 1. If the combined trigger conditions are met, an event combiner event is generated and the counter is reloaded with the preset value. Also, any time a new count value is written into the respective control register, the value in the counter is reloaded. For example, to set a breakpoint to trigger on the third occurrence, the respective counter value should be set to 2.

In addition according to some embodiments, an external signal fed to pin TRGIN 185 allows a user input to generate trace packets to be inserted into a trace stream, generate halts and optionally trigger TRGOUT signals. When "Polarity"=0 (FIG. 6) the trigger input is active high and rising edges cause events. When "Polarity"=1, the trigger input is active low and falling edges cause events. Another control bit may be used to control the filter, for example, to define that the input must be in the active state for a minimum time in order to be recognized. Shorter pulses are then ignored.

The TRGIN event can be listed among the event channel definitions and can be used to start or stop the cycle counter 150, set or reset an event combiner stage 310, start or stop trace unit 120, or take a stack snapshot. Changes in the trigger input will generate a Trace packet if Trace is enabled.

When an event, such as a breakpoint, occurs with an enabled trigger, a pulse on the TRGOUT pin 195 is generated. The basic trigger output signal operation is configured by setting respective control bits. These control bits may for example control that the Trigger Output is asserted for approximately the duration of the trigger event. Adjacent or overlapping events may hold the signal in the asserted state. The control bits may also control whether the output is stretched to a minimum time period. Once the TRGOUT one-shot is triggered, more events occurring within the timing period will be ignored. After the one-shot times out and TRGOUT returns to zero, it may again be triggered by another event. The one-shot is edge triggered, and will clear after a predefined time period even if the event signal persists.

Software may cause a Trigger Out by setting a respective control bit. If the device is awake, the bit is cleared by hardware after 1 cycle. TRGOUT may also be cleared by writing a respective control bit, or will be cleared automatically when the device wakes up.

External, asynchronous resets typically affect the entire processor device. In order to properly record that such an event has occurred, an instruction trace module is designed to be un-affected by the reset without regard to the timing of the reset. The various embodiments thus advance the on-chip debug capabilities and provides features that were previously not available on conventional microcontroller devices. Thus high-tech debugging capabilities usually only known from expensive dedicated in circuit debuggers can be implemented in "normal" microcontroller or microprocessor devices.

Figure 4:
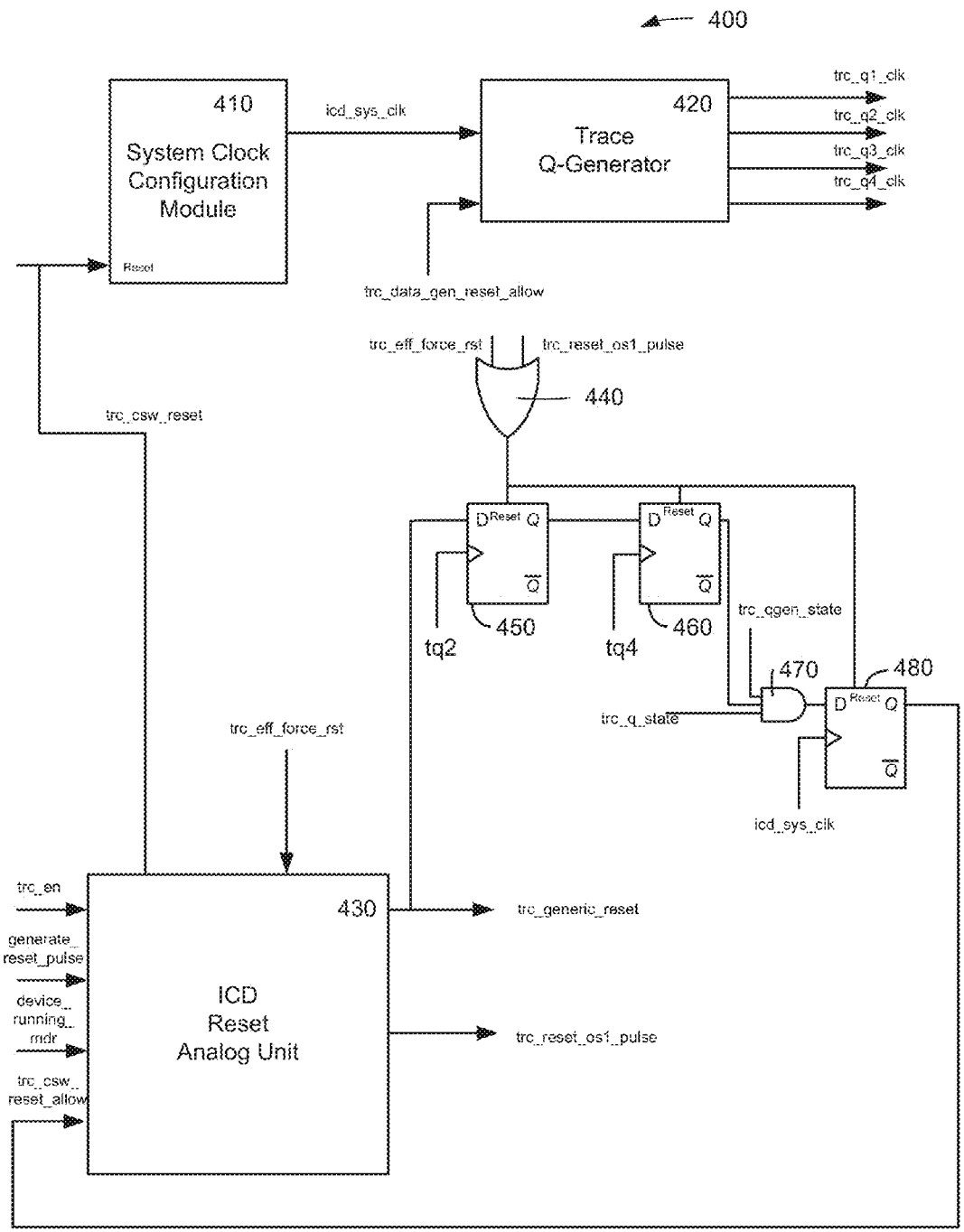
FIG. 4 shows a block diagram for handling the trace clock.
Figure 11:
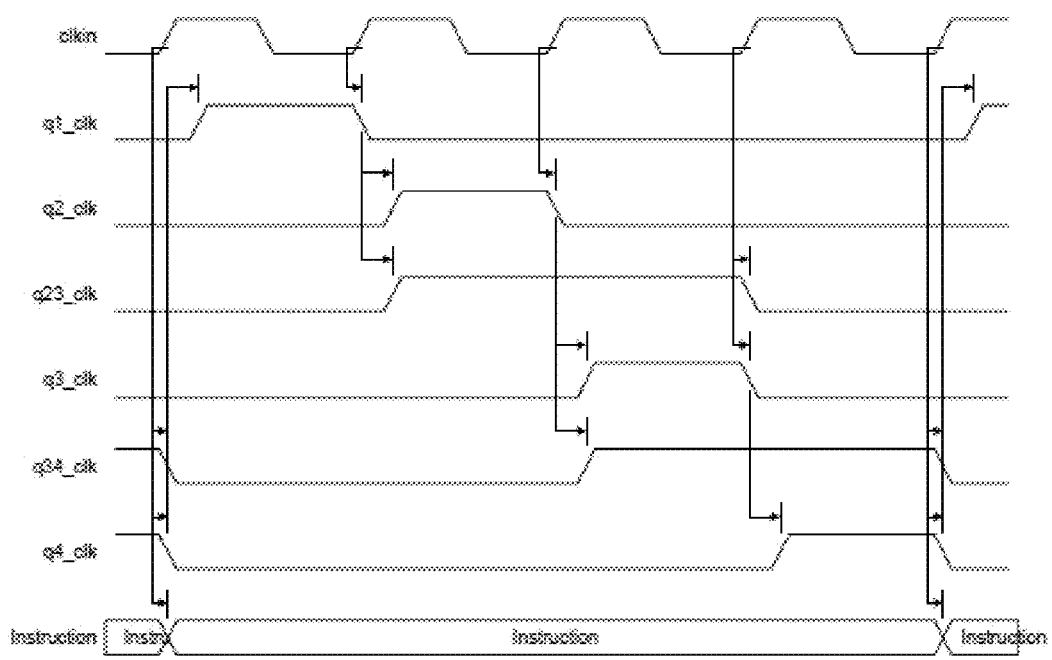
FIG. 11 shows an exemplary timing diagram of a system clock clkin and related quadrature signals.

FIG. 4 shows the high level concept according to various embodiments. The system clock configuration module 410 generates the system clock icd_sys_clk. The System clock is used by the trace Q-generator 420 which generates the 4 phases of the trc_q_clks signals, i.e. trc_q1_clk, trc_q2_clk, trc_q3_clk, and trc_q4_clk. FIG. 11 shows an exemplary timing diagram of a system clock clkin and related quadrature signals with respect to the execution of an instruction. In this embodiment, four clocks q1, q2, q3, q4 derived from clkin are used to execute one instruction. Trace clocks may be derived from internal clocks q1, q2, q3, q4 or may be identical these clocks. However, according to other embodiments a different central processing architecture may be implemented which may allow to execute instructions for example, in a single cycle.

Figure 5:
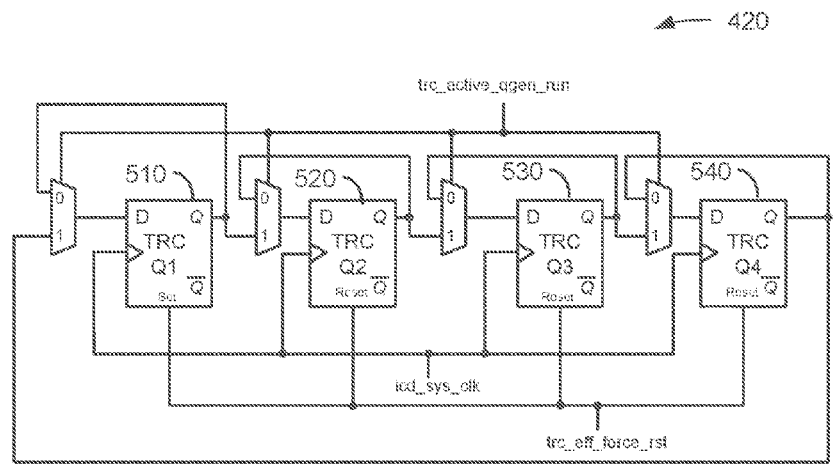
FIG. 5 shows an exemplary trace Q-generator as used in FIG. 4.

FIG. 5 shows details of the schematic of the trace Q-generator 420. It can be a 4-bit cyclic shift register, for example formed by four flip-flops 510, 520, 530, and 540 in a conventional manner. Some examples of reset sources are: watchdog timer WDT reset, RESET instruction executed by the central processing unit, Stack overflow/underflow reset and master clear MCLR reset. However, other reset sources and signal may apply.

Back to FIG. 4, when a generic reset occurs, the Resets Analog Unit 430 allows the generic reset to be asserted to the entire chip, except for the System Clock Configuration Module 410. This allows the system clock to keep running and the trace Q-generator 420 and therefore also the trace data generator 120 can continue operating. While the microcontroller central processing unit 110 is held in reset, the trace data generator records the reset related trace information and then notifies the trace Q-generator that the record is done.

The generic reset condition is also synchronized using trc_q2_clk signal and trc_q4_clk signal, for example by flip-flops 450 and 460, respectively, and as the trace Q-generator 420 stops, the Reset Analog Unit 430 is notified, for example by flip-flop 480, to allow the System Clock Configuration Module 430 to reset.

Figure 6:
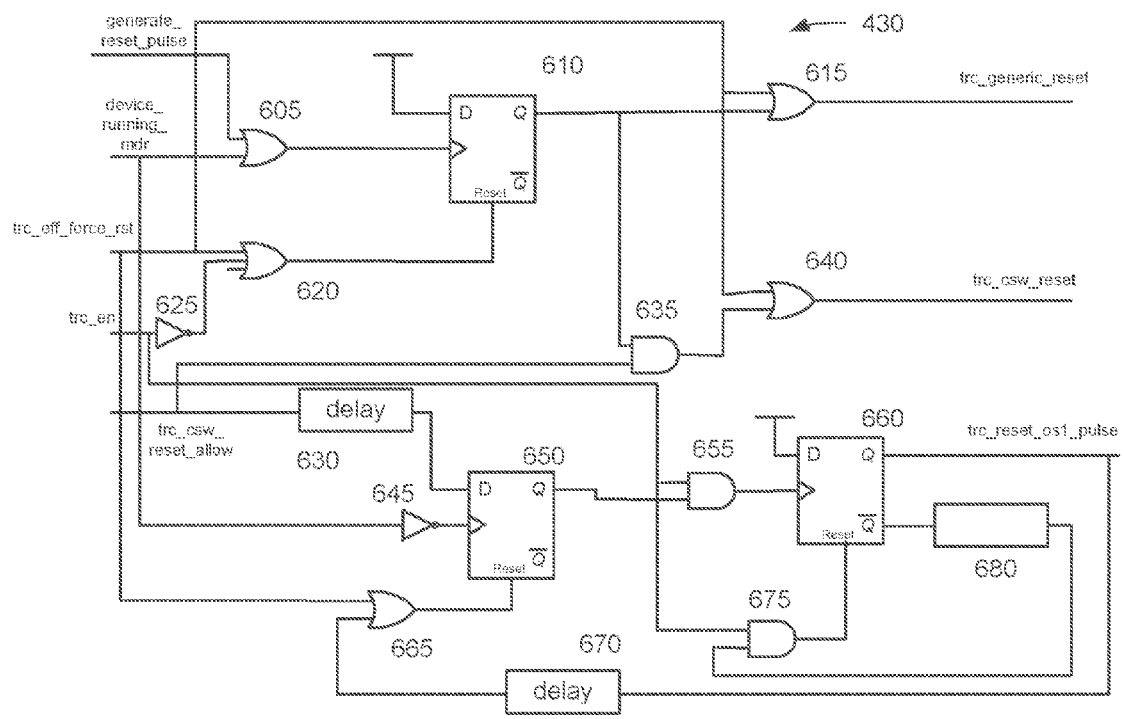
FIG. 6 shows an exemplary ICD analog reset unit as used in FIG. 4 in more detail

An exemplary embodiment of the Reset Analog Unit 430 is shown in FIG. 6. The Reset Analog Unit 430 allows the system clock configuration module 410 to reset after it has been notified to do so. At the same time when the system clock configuration module 430 resets, a one-shot pulse trc_reset_os1_pulse is generated to reset the synchronizer register elements 450, 460, 480 so that the entire circuit can be re-armed for another reset occurrence detection. As shown in FIG. 6, logic can be provided to generate the various control signals. Other logic circuits can be used and adapted depending on the general design of the device.

This various embodiments therefore have the ability to deal with both level sensitive and edge sensitive resets and allows the entire microcontroller system (EXCEPT the system clock configuration module) to reset as soon as the reset occurs, therefore closer to native operation even though an instruction trace is in progress.

The various embodiments ensure that a minimum pulse width duration is guaranteed to reset the system clock configuration module, even though the module was prevented from resetting as soon as the chip reset occurred.

Figure 7:
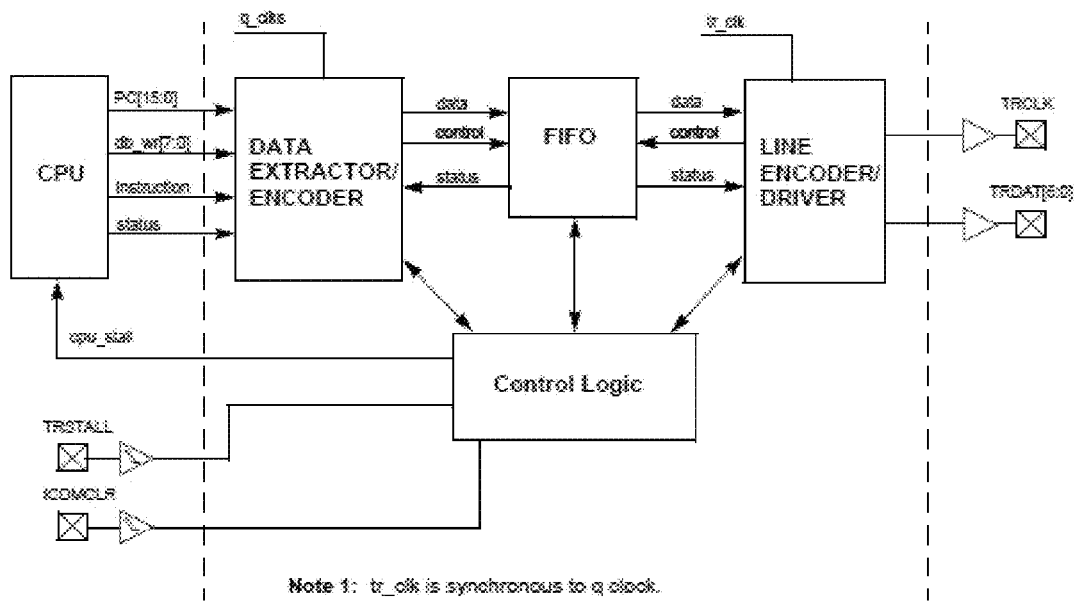
FIG. 7 shows a trace block diagram of FIG. 1 in more detail.

The following section details the trace data interface between the device and an external debug tool. The Trace subsystem as for example shown in FIG. 7 provides a real-time record of the instruction execution stream that can be captured and analyzed by a debug tool. Trace operation assumes that the debug tool has access to the source code and program memory content, and can infer some aspects of CPU operation.

When an instruction writes to PCL (either directly or through INDx), the new PC may be anywhere in program memory. In this case, the instruction packet is replaced by so called full program counter (FPC) packet. A FIFO as shown in FIG. 7 can be used to match the core data rate with the debug tool data rate (governed by TRSTALL). The FIFO is filled from the CPU encoder, and is emptied by the data encoder, as illustrated in FIG. 7. The FIFO holds up to 4096 instruction packets, but the effective operating size may be selected by respective control bits. WATCH event packets are also placed into the FIFO, so the actual number of instruction packets in-flight will usually be less. The TRCLK output, when toggling, outputs one data word with each clock edge. The output clock rate is always linked to the CPU instruction rate, and will change if software changes SYSCLK, or if a reset changes SYSCLK. According to respective configuration, the output rate can always be two trace words per instruction period. The rate can be reduced to 1-per and ½-per instruction, although this will likely lead to FIFO overflow. The TRCLK output can be selected to either be in phase with the data changes or out of phase, depending on the setting of the TRCPS bits. The in-FIFO encoding may be different than the line encoding, so each FIFO location may represent as many as 3 data words in the TRDAT interface.

Figure 8:
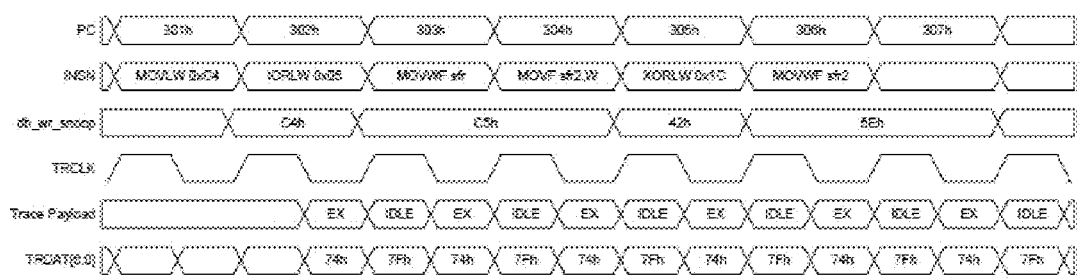
FIG. 8 shows a typical trace signal timing diagram.

A trace stall function can be implemented wherein a configuration bit may determine whether the TRSTALL input has effect or not. For example, when control bit TRXSE=1 and signal TRSTALL=1, the trace FIFO will stop emptying on a payload boundary and stop the clock. When TRSTALL (tr_stall_pin) returns to '0', clocking will resume and the FIFO will begin emptying data again. When trace is enabled and the FIFO is empty, IDLE or SLEEP packets are sent according to the sleep state of the device. The FIFO can also be forced empty and trace can be deactivated according to some embodiments. If the FIFO becomes full, the system response may depends on a respective control setting. In any case, the overflow state (stalled or not posting data) will persist until the FIFO is either 25% or 75% full, as selected by a respective control register. Other functions regarding a trace implementation may be added and some functions as described may not be implemented according to some embodiments. A typical trace signal timing diagram is shown in FIG. 8.

Trace payload packets encode the instructions that the CPU core executes and selected data events, and also provide trace stream synchronization. According to an embodiment, most packets may consist of 1 or 2 seven (7)-bit words, or 3 words for a FPC packet. Generally speaking, the packets consist of a "word 1" and an optional "word 2". However, other formats may be used according to different embodiments. According to a specific embodiment, the value of "word 1" identifies the packet, and implies whether or not "word 2" exists. Packets that are synchronous to instruction execution (like EX, EXD, and RESET) and asynchronous "Event" packets include WATCH, RESET, and TRIGGER as described below in more detail.

Synchronous packets are emitted in the order of execution. Event packets appear in the stream near the time of the event, but if a number of events happen simultaneously, some reports will be delayed. In some cases, FPC is a synchronous report, but at other times it is an event. Transport layer (TR) packets RESYNC, IDLE and END are inserted as required to manage and identify the various states of the interface data stream. TR packets RESYNC and IDLE may be discarded when analyzing the instruction trace.

RESYNC packets are inserted periodically as specified by respective control bits, so that the receiver may verify that it is correctly synchronized. At times roughly corresponding to a predefined time interval, and only if no other FPC has been sent within the interval, an FPC will be added to the stream. This provides a check that the receiver is correctly tracking the instruction stream. Inserted FPCs always indicate the address of the instruction that follows. The number of words in a packet is determined by the value of packet word 1. If RESYNC is received as a word 1 with an incorrect value for "word 2", then the stream is out of sync and an error should be flagged.

Table 1 illustrates a worst-case situation involving a 2-word packet where the 2nd word is 0x7D, followed by a RESYNC. If the receiver is properly synchronized, received word #3 will be a word 1, and word #4 will be a word 2, forming a complete RESYNC pair that is shown as packet #2. Packet #3 begins with word #5, and will be correctly interpreted.

TABLE 1

| Received word | | Packet | |
|---|---|---|---|
| # | Value | Type/data | # |
| 1 | 0x71 | EXD 0xFD | 1 |
| 2 | 0x7D | | |
| 3 | 0x7D | RESYNC | 2 |
| 4 | 0x7D | | |
| 5 | 0x74 | EX | 3 |

Table 2 shows the same data with a clock-bounce duplicating the first word and throwing the receiver out of sync. Words #1 and #2 are received as an EXD packet with data=0x71 (but this is an incorrect interpretation), and words #3 and #4 appear to be a RESYNC pair. Word #5 is taken as word 1 of a new RESYNC packet, but word #6 is not 0x7D, revealing the out-of-sync state. Word #6 begins a new packet.

TABLE 2

| Received word | | Packet | |
|---|---|---|---|
| # | Value | Type/data | # |
| 1 | 0x71 | EXD 0xF1 | 1 |
| 2 | 0x71[(1)] | | |
| 3 | 0x7D | RESYNC | 2 |
| 4 | 0x7D | | |
| 5 | 0x7D | Error | Note 2 |
| 6 | 0x74 | | 3 |

Note
1: Receiving a duplicate word is typical of an impedance mismatch in the clock cable.
2: It is sufficient to say that the first non-0x7D that follows any 0x7D packet (word 1 = 0x7D) is always a word 1 (or FPC word #3). The receiver must immediately re-interpret word #6 as the first word in a new packet.

The first packet sent when tracing begins, or when tracing resumes after being suspended for the debug executive, will always be an FPC. The Full Program Counter (FPC) packet reports the absolute address of the next instruction that appears in the stream. The FPC report in these situations:

start of trace, resumption after overflow, and resumption after debug, simply indicates the address of the next instruction.

All other uses of FPC indicate that an instruction has executed, and in some cases replaces the packet that would have been reported for that instruction. When the FPC represents execution of a branch or program counter altering instructions, the value reported is the branch target address. The instruction packet following the FPC represents the execution of the instruction to which the FPC points.

The GOTO and CALL instructions assume that the least significant bits of the program counter PC[10:0] are known to the debug environment (in the assembly code), and only the upper 4 bits of the new PC are reported in an upper partial program counter (UPC) packet. However, other embodiments may report more or less information. The reported value can be 0x0F & (PCLATH>>3), wherein PCLATH represents an implementation specific register that latches the upper bits of the program counter. Since the destination of relative branches (BRA) is known to the source code, the instruction is reported simply as EX. A wide variety of trace payloads may be implemented. Table 3 shows an example of different payload signals.

TABLE 3

| Mnemonic | Description | Group | Trace Encoding Word 1 (Word 3) | Word 2 | Number of 7 bit words Sent | Sent when TRIEN = 0 |
|---|---|---|---|---|---|---|
| WATCH | Data trace watch point | Trace data | o ccccc d | ddd dddd | 2 | Yes |
| FPC | Full new PC, P = PC[14:0] Implies execution of the current instruction The 2 packets are sent contiguously | | 100 pppp (PC[14:11]) 101 pppp (PC[3:0]) | ppp pppp (PC[10:4]) | 3 | 1FPC within RESYNC interval |
| UPC | Upper Partial PC, P = PC[14:11] Implies execution of the current instruction | | 110 PPPP (PC[14: 11]) | | 1 | No |
| EXD | Execute instruction, D = data stored | | 111 000d | ddd dddd | 2 | No |
| EX | Execute Instruction | | 111 0100 | | 1 | No |
| STALL | No instruction is executed (forced to NOP) PC is unchanged (Section 3.19.3.5) | | 111 0101 | | 1 | No |
| SKIP | No instruction is executed (forced to NOP) PC is incremented | | 111 0110 | | 1 | No |
| OVERFLOW | FIFO has overflowed; data was lost | | 111 0111 | 111 0111 | 2[(3)] | Yes |
| INT | interrupt Vector Vectoring to interrupt vector N | | 111 1000 | nnn nnnn Table 3-8 | 2 | No |
| RESET | CPU is being reset PC is now equal to RSTVEC | | 111 1010 | v00 nnnn FIG. 3-4 | 2 | Yes |
| ERROR | An internal error is noted; refer to hardware documentation for details. | | 111 1010 | xlx eeee FIG. 3-4 | 2 | Yes |
| TRIGGER | TRGTR = 1 and Trigger input change | | 111 1011 | | 1 | Yes |
| SLEEP | TREM = 2'b1X, FIFO is empty, Sleeping | Transport | 111 1100 | | 1 | Yes |
| RESYNC | Periodic resync FPC will be sent with the same interval. | | 111 1101 | 111 1101 | 2[(3)] | Yes |
| IDEL | TREM = 2'b1X, FIFO is empty (not Sleeping, not TRSTALL) | | 111 1110 | | 1 | Yes |

TABLE 3-continued

|  |  |  | Trace Encoding | | Number of 7 bit | |
|---|---|---|---|---|---|---|
| Mnemonic | Description | Group | Word 1 (Word 3) | Word 2 | words Sent | Sent when TRIEN = 0 |
| END | TREN = 2'b00 |  | 111 1111 | 111 1111 | 2 or 3[(2,3)] | Yes |
| Reserved |  |  | 111 001x |  | 1 |  |

Note
1: All fields are sent MSB first
[(2)]The END packet will be sent at least twice, and possibly a third time so that TRCLK stops in the low state.
[(3)]The receiver should handle OVERFLOW, RESYNC and END as 1-word packets; see the discussion in Appendix A.2.3.
Legend:
c = channal for watchpoint
p = Program counter
d = Write Data Table 4 shows an actual trace example:

TABLE 4

|  | Instruction | | Packet |
|---|---|---|---|
| Cycle | PC(0x) | Opcode | Type/data |
| 1 | 123 | MOVLW HIGH(2300) | EX |
| 2 | 124 | MOVWF PCLATH | EXD 8'h23 |
| 3 | 125 | MOVLW #3 | EX |
| 4 | 125 | CALL 200 |  |
| 5 |  |  | UPC-4[(1)] |
| 6 | 2200 | BTFSS W,7 | EX |
| 7 | 2201 | BRA $ + 4 |  |
| 8 |  |  | FPC |
| 9 | 2205 | NOP (Note 2) | EX |
| 10 | 2206 | BRW |  |
| 11 |  |  | FPC 220A[(2)] |
| 11 | 220A | RETLW #77 |  |
| 12 |  |  | FPC |
| 13 | 126 | NOP | EX |
| 14 | 127 | CALLW |  |
| 15 |  |  | FPC 2377[(1)] |
| 16 | 2377 | NOP | EX |
| 17 | 2378 | GOTO 500 |  |
| 18 |  |  | UPC-4[(1)] |
| 19 | 2500 | NOP | EX |
| 20 | 2501 | RETURN |  |
| 21 |  |  | FPC |
| 22 | 128 | NOP | EX |

Note
[(1)]If TRFPCB = 1, this instruction reports FPC.
[(2)]The PC value for cycle 8 is not 15'h2205 because PCLATH = 8'h23 (from cycle 2); the UI should flag this error.

Changes in the trigger input will generate a Trace packet if a respective control bit is set. If the polarity bit=0, the event will trigger on the rising edge. If the polarity bit=1, the event will trigger on the falling edge. When an instruction writes to the program counter PCL either directly or indirectly, the new PC may be anywhere in program memory. In this case, the instruction packet is replaced by an FPC packet.

A FIFO is used to match the core data rate with the debug tool data rate (governed by TRSTALL). The FIFO is filled from the CPU encoder, and is emptied by the data encoder, as illustrated by FIG. 6. The FIFO holds up to 4096 instruction packets, but the effective operating size is selected by respective bits in a control register. WATCH event packets are also placed into the FIFO, so the actual number of instruction packets in-flight will usually be less.

The TRCLK output, when toggling, outputs one data word with each clock edge. The output clock rate is always linked to the CPU instruction rate, and will change if software changes SYSCLK, or if a reset changes SYSCLK. When a respective bit field in an associated control register is set, the output rate may be always two trace words per instruction period. The rate can be reduced to 1-per and ½-per instruction, although this will likely lead to FIFO overflow according to some embodiments. The trace clock TRCLK output can be selected to either be in phase with the data changes or out of phase, depending on the setting of respective control bits. The in-FIFO encoding is different than the line encoding, so each FIFO location may represent as many as 3 data words in the TRDAT interface.

Figure 9:
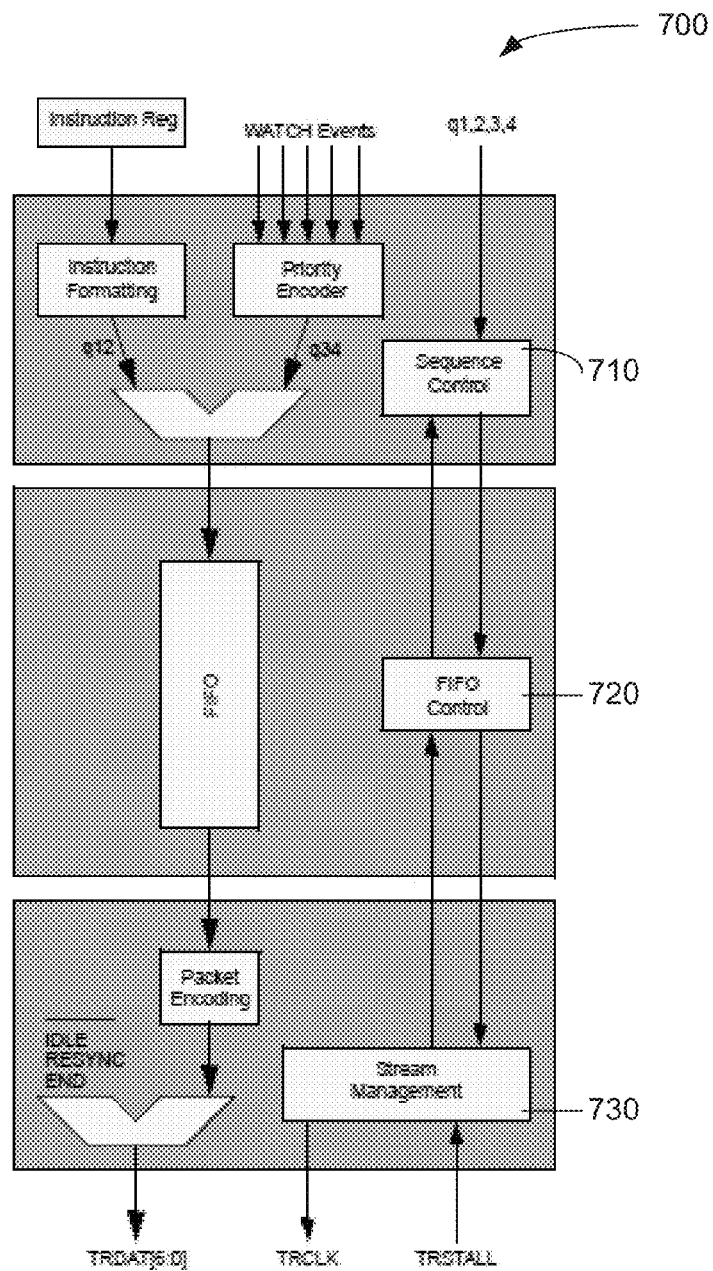
FIG. 9 shows a simplified block diagram trace sub system.

FIG. 9 shows a simplified block diagram of the trace sub system 700. The subsystem 700 receives instruction codes from the core and WATCH event signals, and formats this data for delivery on the TRDAT signals. The sequence controller 710 is responsible for loading instruction and WATCH data into the FIFO. Each data packet is encoded as a single 16-bit word. During q34, the WATCH signals are sampled, and the signal of highest priority is encoded, loaded, and reset. If more than one signal is asserted, only the highest priority signal is loaded and the others must wait for subsequent q34 opportunities. Since report priority is based on breakpoint number, events may be reported out of order. During q12, data from the previous instruction is encoded and loaded (the opcode is encoded in q3, and bus data is stable q3-q3, and all is valid at rising q1). Generally speaking, this occurs every instruction period. For branch and call instructions, as well as interrupt cycles, nothing is loaded during the first cycle, and the packet is encoded during the 2nd cycle (the so-called "forced NOP"), allowing UPC and FPC to be emitted with the correct PC value. Consequently, two WATCH packets may be loaded during a branch. SKIP and STALL are encoded based on the current core operation.

The sequence controller 710 can load twice per instruction cycle, and the stream manager 730 can unload twice per instruction cycle, requiring up to four (4) memory cycles per instruction cycle. The FIFO controller 720 manages the data provided by the sequence controller 710. Data is delivered in the same order, when requested by the stream manager 730. The stream manager 730 reformats the 16-bit FIFO words into the data words transmitted on the TRDAT signals. Some packets (e.g., EX) produce a single TRDAT word for each FIFO word, while others (e.g., FPC) produce more. As required, the transport management packets RESYNC, IDLE and END are inserted into the stream, and the read-out operation is paused according to the TRSTALL input. There are two (2) TRDAT words transmitted during each instruction cycle period. The TRCLK signal will pause (stretch part of a cycle) during a system reset (data will not be lost).

Figure 10:
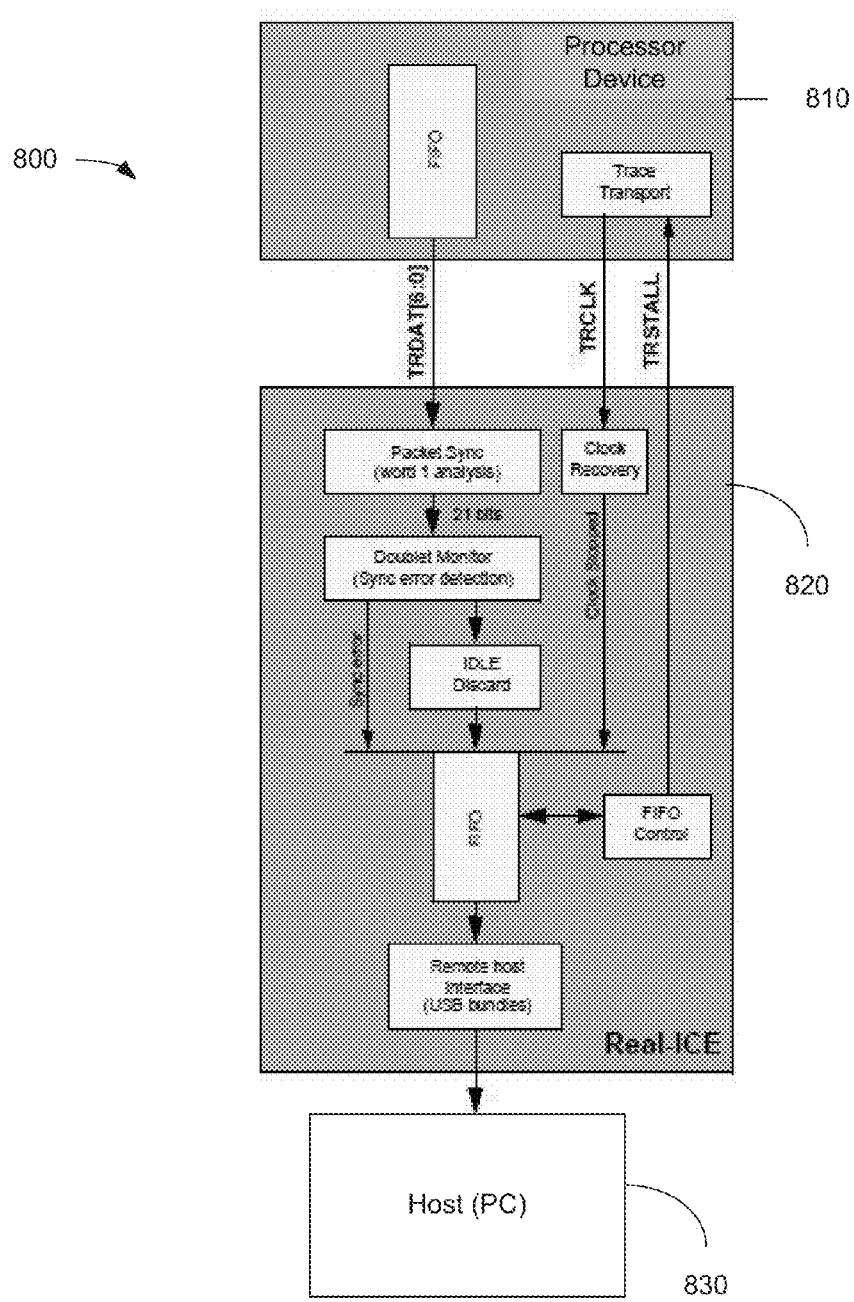
FIG. 10 shows a block diagram of a system using a microcontroller with an embedded debug unit according to various embodiments and an external in circuit debug (ICD) controller.

FIG. 10 shows a system 800 with a microcontroller 810 according to various embodiments coupled with a debug tool 820 operating as a trace receiver. The debug tool can be, for example, a Real-ICE in circuit emulator manufactured by Applicant. The receiver 820 performs trace synchronization, discards all IDLE and Transport packets, and transmits bundles of the remaining packets to a remote host 830, for example a personal computer or work station where packet stream interpretation is performed.

- Word 1 analysis—convert packets to a 3-wordwide data bus.
- Examine doublets (RESYNC, OVERFLOW, etc.), and flag sync errors when (a) doublets are not in consecutive words, or (b) an unimplemented word 1 code value is seen.
- Discard IDLE and other transport packets, and stack the remaining values into a FIFO.
- Transmit whole packets to the remote host.

When asserting TRSTALL, the receiver 820 is prepared to accept up to 6 more TRDAT words (the equivalent of 2 consecutive FPC packets), plus the 2 words that may be enqueued in the resynchronization pipeline. When releasing TRSTALL, packet word 1 alignment is guaranteed. From a string of IDLE packets most, or sometimes all, can be discarded and not shipped to the remote host, to reduce bandwidth. Unimplemented opcodes and FPC word 3 (7'h5x) should also be flagged as synchronization errors, and treated as 1-word packets.

The 3rd word of FPC is encoded in the style of a single-word packet (e.g., code 7'h5x). Whether in sync or not, it may be assumed that the word following any word of, e.g. 7'h5x, is a word 1 of a new packet. For the purpose of tracking word 1, OVERFLOW, RESYNC, SLEEP and END packets should be treated as 1-word packets. When 7'h7D is treated as a 1-word packet, the following packet will then always be a word 1 value, even if it is another 7'h7D (the paired RESYNC word). Word 1-aligned (pseudo) data is passed to the doublet analysis, where synchronization failure is recognized when two RESYNC do not appear contiguously in the stream. Likewise, OVERFLOW (7'h77) can appear when the receiver is out of sync, and must be accurately interpreted even if the 2nd word does not match. This could also flag a synchronization error. Similar reasoning can be applied to SLEEP and END packets since, if the receiver is out of sync, only one 7'h7C or 7'h7F might appear at the end, and it would be unsuitable for the receiver to hang while waiting for a second value. At the other extreme, three identical words might appear, and should not confuse the receiver either.

For complete analysis, host 830 must compare the trace data to the original source code used to program the microprocessor. For most instructions, the trace data declares that execution occurred, but the operational details are not included. When branches produce only EX packets (TRF-PCB=0), the branch destination can only be determined by examining the source code. Similarly, according to a specific embodiment, writing to PCLATH emits only partial data, and requires source knowledge to complete the evaluation. Depending on the operation, STALL packets may precede or follow the affected instruction. STALL packets may be viewed as a suggestion that a non-typical operation has taken place (e.g., file select register (FSR) writing to non-volatile memory), with a highlighted notation on the user's display. WATCH reports may lag the triggering instruction by many packets. Densely populated watches may actually be lost if the same watch triggers before read-out occurs. Since watchpoints identify only the data address, trace analysis must be able to reconstruction data access pointer values, whether from direct-addressing modes (requiring knowledge of BSR and the opcode) or from indirect modes (requiring knowledge of FSRs). Watch data is always from the most-recent occurrence of the watch event. Beware that some FPC packets imply that instructions have executed (e.g., RETURN instructions), but other instances are simply informative.

Figure 12:
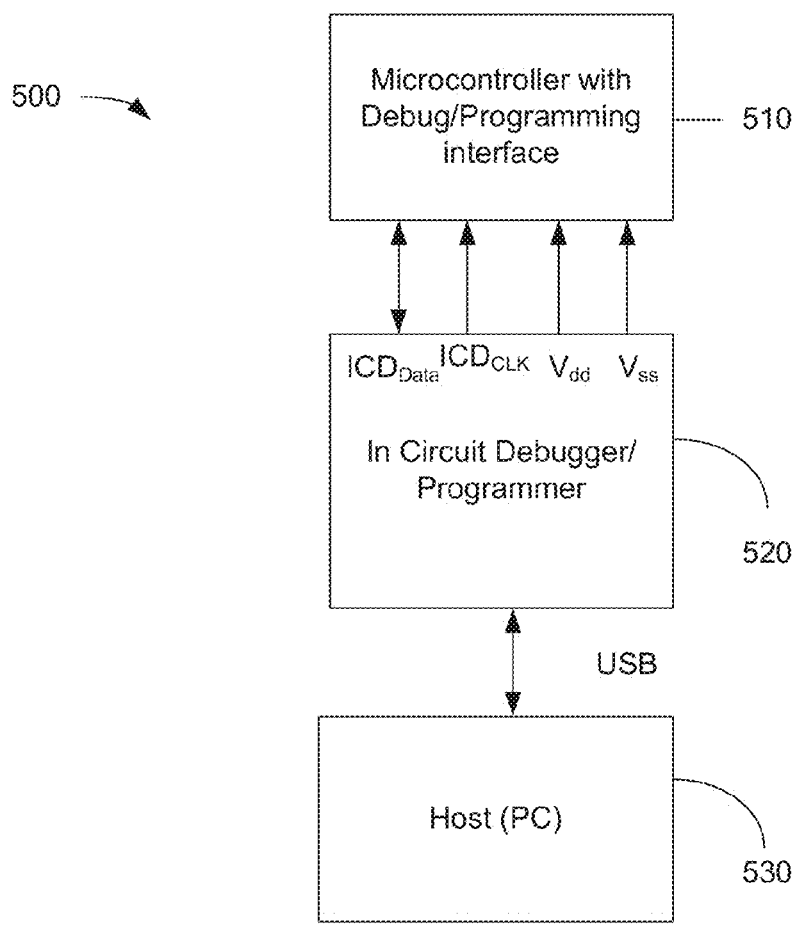
FIG. 12 shows a block diagram of a system using a microcontroller with an embedded debug unit according to various embodiments and an external in circuit debug (ICD) controller.

FIG. 12 shows a typical debugging/programming system 500 with a host such as a personal computer running a development program and being connected, for example via a USB interface with an external debugger/programming unit 520. The external debugger programming unit 520 provides for a dedicated interface which may supply a power supply voltage generated within the debugger/programmer 520. However, other embodiments may supply the supply voltage via a dedicated power source or the target system may be self powered. The actual debug/programming interface may be provided by a synchronous serial interface with a unidirectional clock signal $ICD_{CLK}$ provided by the debugger/programming unit 520 and a bidirectional data line $ICD_{Data}$. Thus, at a minimum three connection lines, $ICD_{CLK}$, $ICD_{Data}$. and reference potential (GND) may be used to couple the debugger/programming unit 520 with the target system 510 which as a minimum may be a microcontroller with a debugging/programming interface according to various embodiments as described above.

Such a system allows a user to program the debugging program running on the host to set various breakpoints having conditions as explained above and optionally receive trace information through additional connection lines while the program is executing in real time. While the debugging software keeps track of the various breakpoints with respect to their position in the source code, the debugger/programmer 520 communicates the breakpoint information to the target device which sets the respective breakpoints and configures its associated registers. Also, setting and configuration of the trace capabilities are communicated by the debugger/programmer 520 to the target device 510. For example, a specific breakpoint being triggered by a match of a data value stored in memory may be set. A user then starts execution of the software of the target device 510 through the debugger software running on the host PC 530. The execution of the target software is only stopped when a breakpoint is detected. However, trace information may be forwarded continuously during execution of the target program. The host computer 530 can evaluate this trace data and make it available in either text form or using a graphical display. As disclosed above, a reset event can also be fully traced as the trace subsystem is still clocked according to various embodiments.

The present embodiments allow for a better analysis of a trace stream by implementing the features as discussed above. The various embodiments therefore advance the state of the art in on-chip debug capabilities, and will allow to bring high tech debugging capabilities to more, different users.

What is claimed is:

1. A processor device having debug capabilities, comprising:
   a central processing unit;
   debug circuitry including a trace module;
   a system clock module for providing internal clock signals, wherein resetting the processing device requires the system clock module to be reset for a minimum reset duration;
   a reset detection unit which during a debug mode is operable to prevent the system clock module from directly receiving a reset signal, wherein the trace module is operable to record trace information after a reset signal has been detected and generates a signal having said minimum reset duration after recording said said trace information that resets the system clock module.

2. The processor device according to claim 1, wherein the trace information includes a reset source information.

3. The processor device according to claim 1, wherein the trace module generates a trace stream including information about executed instructions, wherein the trace stream is output through an external interface.

4. The processor device according to claim 3, wherein the trace stream is packet based.

5. The processor device according to claim 4, wherein a trace packet in the trace stream includes information about a trigger source.

6. The processor device according to claim 5, wherein the information is provided conditionally, wherein a condition can be user defined.

7. The processor device according to claim 1, wherein a reset signal can be a synchronous reset signal or an asynchronous reset signal.

8. The processor device according to claim 7, wherein a synchronous reset signal is generated by a watchdog timer WDT, a RESET instruction executed by the central processing unit, a Stack overflow/underflow reset.

9. The processor device according to claim 7, wherein an asynchronous reset signal is received through an external pin of the processor device.

10. A method for debugging executed code within a processor device comprising a system clock module for providing internal clock signals, wherein resetting the processing device requires the system clock module to be reset for a minimum reset duration, the method comprising:
    executing code by a central processing unit (CPU);
    upon determining of a reset, forwarding reset signals to internal units of the microcontroller with the exception of the system clock module to allow further operation of a trace module;
    recording trace information after reception of said reset by the trace module, and
    generating a signal having said minimum reset duration after recording said trace information that resets the system clock module.

11. The method according to claim 10, wherein the trace information includes a reset source information.

12. The method according to claim 10, wherein the trace module generates a trace stream including information about executed instructions, wherein the trace stream is output through an external interface.

13. The method according to claim 12, wherein the trace stream is packet based.

14. The method according to claim 13, wherein a trace packet in the trace system includes information about a trigger source.

15. The method according to claim 14, wherein the information is provided conditionally, wherein the condition can be user defined.

16. The method according to claim 10, wherein a reset signal can be a synchronous reset signal or an asynchronous reset signal.

17. The method according to claim 16, wherein a synchronous reset signal is generated by a watchdog timer WDT, a RESET instruction executed by the central processing unit, a Stack overflow/underflow reset.

18. The method according to claim 16, wherein an asynchronous reset signal is received through an external pin of the processor device.

* * * * *